United States Patent
Frantz et al.

(10) Patent No.: US 9,473,238 B2
(45) Date of Patent: Oct. 18, 2016

(54) METHOD AND DEVICE FOR PROCESSING A COMMUNICATION NETWORK

(75) Inventors: Michael Frantz, Bad Aibling (DE); Joerg Reichert, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 86 days.

(21) Appl. No.: 14/239,919

(22) PCT Filed: Aug. 22, 2011

(86) PCT No.: PCT/EP2011/064379
§ 371 (c)(1),
(2), (4) Date: May 14, 2014

(87) PCT Pub. No.: WO2013/026469
PCT Pub. Date: Feb. 28, 2013

(65) Prior Publication Data
US 2014/0255024 A1    Sep. 11, 2014

(51) Int. Cl.
*H04B 10/07* (2013.01)
*H04L 12/24* (2006.01)

(52) U.S. Cl.
CPC ............. *H04B 10/07* (2013.01); *H04L 41/145* (2013.01)

(58) Field of Classification Search
None
See application file for complete search history.

(56) References Cited

U.S. PATENT DOCUMENTS

| 2007/0094381 | A1 | 4/2007 | Weiss et al. |
| 2008/0193125 | A1 | 8/2008 | Weber et al. |
| 2009/0044079 | A1* | 2/2009 | de Lind Van Wijngaarden ......... H04L 1/0009 714/774 |

FOREIGN PATENT DOCUMENTS

| EP | 1569148 A2 | 8/2005 |
| WO | 03/052981 A1 | 6/2003 |
| WO | 2009/020529 A2 | 2/2009 |
| WO | 2013/026469 A1 | 2/2013 |

OTHER PUBLICATIONS

International Search Report and Written Opinion for Application No. PCT/EP2011/064379, 11 pages, dated Jun. 25, 2012.

* cited by examiner

*Primary Examiner* — Darren E Wolf
(74) *Attorney, Agent, or Firm* — Nelson Mullins Riley & Scarborough LLP

(57) ABSTRACT

Method and device for processing a communication network A method and a device for processing a communication network are provided, wherein (a) a first performance parameter of the communication network is determined; (b) a third performance parameter is determined based on the first performance parameter and a second performance parameter, which second performance parameter was previously determined, wherein the second performance parameter comprises a forecast of an expected network performance over time until the end of the scheduled lifetime of the communication network; and (c) the communication network is processed based on the third performance parameter. Furthermore, an according computer program product is suggested.

11 Claims, 6 Drawing Sheets

METHOD AND DEVICE FOR PROCESSING A COMMUNICATION NETWORK

RELATED APPLICATIONS

This application is a 35 U.S.C. 371 national stage filing of International Application No. PCT/EP2011/064379, filed on Aug. 22, 2011. The contents of the aforementioned application is hereby incorporated by reference.

The invention relates to a method and to a device for processing a communication network. The invention in particular relates to a method and system for planning, dimensioning, and cost efficient use of optical communication networks. The term "cost efficient use" in particular aims at both the total costs of equipment and its installation (CAPEX) as well as its operation and maintenance (OPEX).

BACKGROUND OF THE INVENTION

Optical communication networks are built from various components acting as, e.g., sources, guides, processing units, and sinks of optical signals. Such components, e.g., lasers, fibers, amplifiers, splitters and combiners, switches, and photoelectric receivers, may be built using different technologies. Common properties, however, of such components are a degradation of performance parameters over time caused by aging and their susceptibility to mechanical and/or other physical impacts, which may result in further deterioration regarding their performance. Other effects and sources of impairments of the system performance may depend on the number and density of optical channels sharing common physical resources like, e.g., fibers, and from the load of the network or individual network components. Most of these effects may not have a significant impact during an early phase of a network's lifetime, but aggravate over time with increasing network utilization and age of its components. Such deteriorating effects may further accumulate along an end-to-end communication path.

Network planning and dimensioning thus has to take into account such deteriorating effects in order to ensure the performance for end-to-end paths during and until the end of the network's planned lifetime.

In order to cope with the effects as mentioned above, optical communication network planning and dimensioning usually starts from a so-called end-of-life performance, i.e. a target level of performance intended to be met by a completely equipped and fully loaded network under worst-case conditions assumed at the end of its scheduled lifetime. Such worst-case conditions include an expected amount of degradation due to aging of the components and an additional margin to cover effects of mechanical and other physical or chemical impacts that might be experienced during the lifetime of the system.

Network planning and dimensioning starts with an end-of-life target performance, adds a margin for mechanical and physical or chemical impacts, and the expected deterioration due to aging. FIG. 1 illustrates in an example the principles of system planning together with an example of a potential real-life behavior of a system. In order to meet the end-of-life requirements, the network has to be planned and dimensioned according to an initial system performance determined from the end-of-life target performance and the respective margins for aging and other impacts.

As shown in FIG. 1, real system performance degrades over time due to aging. The shape of the aging curve can be of various forms, e.g., concave, convex, regular or irregular; usually the curve decreases more or less continuously. Discontinuities or steps may occur due to mechanical or other physical impacts on the equipment.

In case of proper dimensioning of the system, i.e. if a well dimensioned margin is added during initial network planning, such margin will suffice for performance degradation over the lifetime of the system and the remaining system performance at the end-of-life will at least meet the planned target. Consequently, the system will be capable of supporting the variable and usually increasing service demand and the resulting system usage during the full lifetime period.

Insufficient dimensioning on the other hand results in the system performance not reaching the end-of-life target level. This may result in service degradations or incapabilities to provide services or service levels as initially planned. FIG. 2 illustrates an example of potential effects of insufficient dimensioning of a system. The example shows a real system performance at a time T1 undergoing the planned target level and the system being unable to fulfill the current service demand at a time T2. As a consequence, the system will exhibit service degradation up to a complete outage of some or all of its service channels.

EP 1 636 929 B1 discloses a method for the pre-emphasis of optical wavelength division multiplex signals wherein in order to achieve preset optical signal-to-noise ratios (OSNR), the power settings of individual channel signals or groups of channel signals are adjusted at their entry points (i.e. related network elements) to the network. Channel or group of channel specific OSNRs are evaluated and adjusted relative to each other based on pre-assigned profiles provided by a network planning tool. The pre-assigned profiles are static and either calculated from theoretically expected path characteristics or determined by related noise measurements.

However, EP 1 636 929 B1 relates to static conditions only and does not refer to aging or other lifetime impacts on network parameters. The solution disclosed in EP 1 636 929 B1 may be used to determine discrete power level values to be assigned to channels and groups of channels at the start of the lifetime or at a certain point in the lifetime of a system.

[http://www.netfast.com/xq/asp/qx/PDF/Alcatel/1830_PSS_bro.pdf] is an advertising brochure promoting a photonic services switch and discloses a so-called "wavelength tracker technology" allegedly capable of "end-to-end power control, monitoring, tracing and fault localization for each individual wavelength channel". The solution is focused on wavelength path management to enable "quick troubleshooting and fault isolation" in case of immediate service impairments or outages.

Accounting for end-of-life worst-case conditions at the start-of-life of an optical communication network requires huge performance margins and results in a network being significantly over-dimensioned. It requires a high upfront investment, i.e. capital expenditures (CAPEX), even if the network usage starts at a low level and (slowly) develops growth over time. In many scenarios when a system has been up and running for some time it then becomes apparent that far less resources spent in dimensioning the network would have been fully sufficient. On the other hand, even a huge margin may not suffice, if extreme mechanical or other physical stress leads to extraordinary deteriorations of the system performance.

SUMMARY

It is thus an objective of the invention to provide planning, dimensioning and operation of an optical communication network that avoids excessive initial CAPEX spending and enables a smooth and economical growth of the network usage, while ensuring reliable performance levels over the full lifetime of the network until its scheduled end-of-life.

The object is achieved by a method, a device, and a computer program product for processing a communication network.

In a first embodiment a method for processing a communication network is provided, wherein
(a) a first performance parameter of the communication network is determined;
(b) a third performance parameter of the communication network is determined based on the first performance parameter and a second performance parameter of the communication network, which second performance parameter was previously determined, wherein the second performance parameter comprises a forecast of an expected network performance over time until the end of the scheduled lifetime of the communication network; and
(c) the communication network is processed based on the third performance parameter.

With this method the communication network can be monitored and/or supervised e.g. for parameters impacting its optical and/or transmission performance. The evolution of optical signal quality, characterized e.g. by power levels, OSNRs and/or non-linear distortions caused by e.g. signal attenuation in components, cross talk between channels and wave-lengths, or non-linearities in component characteristics, can be determined by iteratively applying the steps (a) and (b) and then including the third parameter in or as the second parameter for a subsequent iteration of the steps (a) and (b). Transmission performance, most prominently characterized by throughput and bit error rates, may be monitored and/or supervised in parallel with or separate from optical performance using the same method. Due to a strong dependency the results for the optical performance may be advantageously used to determine the transmission performance.

It is noted that the second performance parameter may comprise several discrete and/or continuous performance parameters over time until the end of the scheduled lifetime of the communication network; hence, the second parameter may be or comprise an aging curve that allows a prediction whether or not a planned target can be reached. It is further noted that the second parameter may in particular be adjusted by iteratively applying (at least a portion of) the method steps as mentioned and utilizing the third performance parameter. The second performance parameter may be (part of) a model relating to the performance of the network based on, e.g., assumptions, theoretical calculations, recent evaluations and/or measurements.

Applications and/or iterations of the method can be performed and/or triggered automatically or manually. The approach may provide an early warning system to adjust the communication network in order to cope with deterioration, additional traffic or other effects.

The approach in particular allows for a less conservative planning, i.e. lower CAPEX due to a reduced and/or relaxed worst-case scenario. Still, the quality requirements of the communication system can be maintained due to the flexibility of this solution that enables dynamically adjusting the system (or components thereof) based on repetitive end-of-life prediction.

It is noted that the first, second and third performance parameter may each comprise at least one parameter, or a set of parameters. The second performance parameter may further include historical and/or predictive data.

It is further noted that processing of the communication network comprises observing, supervising and/or adjusting the communication network.

In addition, the method may be provided by a network tool, in particular by a network planning tool, organized as a stand-alone tool, or associated with a network element, or associated with or incorporated in a Network Management System (NMS).

The first performance parameter can be determined by or based on an actual measurement of at least one (actual) system parameter or the like.

In an embodiment, processing of the communication network comprises at least one of the following:
monitoring of the communication network;
supervising of the communication network; and/or
adjusting of the communication network.

In another embodiment, the communication network comprises network elements susceptible to a potential degradation of their performance.

The network elements may also be referred to as network components. The degradation may be determined by the first performance parameter in view of the second (past or predictive) performance parameter. Hence, an evolution of the performance can be determined by evaluating actual values with previous values of a (or at least one) performance parameter.

The degradation of the performance may be based on aging, mechanical stress, other physical or chemical impact and/or other effects.

Advantageously, the solution presented allows determining the actual deterioration and thus to act accordingly to initiate proper counter-actions to reach the pre-defined end-of-life of the communication system. It is in particular an advantage that a deterioration of a particular portion of the communication network is revealed and a corrective measure may be directed to this particular portion only.

In a further embodiment, the third performance parameter is determined based on a service level requirement of the communication network such that the service level requirement is fulfilled at any time of a pre-defined lifetime of the communication network.

Hence, a network performance parameter missing the expected end-of-life time performance (e.g., due to deterioration effects) can be determined, e.g., by comparing the first and the second parameter. The service level requirement can be maintained by adjusting the communication network accordingly.

In particular, the third parameter can be adjusted by processing, e.g., adjusting and/or reconfiguring, the communication network accordingly.

In a next embodiment, the communication network being processed based on the third performance parameter comprises informing a network management system and/or an operator.

This is in particular useful in case intended adjustments and/or reconfigurations of (configuration and/or control) parameters are not possible, not allowed or not sufficient to fulfill the end-of-life requirement, i.e. to comply with the service level requirements of the communication services provided by the network. In such case, the communication network being processed may include further steps such as e.g., component upgrades, provision of additional components, network and/or traffic rearrangements, etc.

It is also an embodiment that the third performance parameter is stored as the, or as a portion of the second performance parameter.

Hence, the adjusted and reconfigured configuration and control parameters of the network, its network elements and components and the resulting improved network performance parameters can be incorporated in the calculation of another third parameter in a subsequent iteration of the suggested method.

Pursuant to another embodiment, the first performance is determined based on data representing an actual status and/or a performance capability of at least one network element of the communication network.

According to an embodiment, the third performance parameter may comprise a forecast of expected network performance parameters over time until the end of the scheduled lifetime of the communication network.

This may also apply for the second performance parameter.

According to another embodiment, the execution, or an iteration of the method is executed periodically or triggered manually.

In yet another embodiment, the execution, or an iteration of the method is triggered by a network element and/or a network management system upon detection of a parameter change exceeding a predetermined threshold.

Hence, in case the parameter change has a potential impact on the communication network's performance (e.g., within a network element of the communication network), steps of the method can be triggered in order to determine whether or not the communication network needs to be adjusted.

According to a next embodiment, the first, second and/or third performance parameter comprises at least one of the following:
  a power level;
  an optical signal-to-noise ratio;
  a bit error rate.

Pursuant to yet another embodiment, the communication network is or comprises an optical communication network.

The problem stated above is also solved by a device for processing a communication network comprising or being associated with a processing unit that is arranged
  (a) for determining a first performance parameter of the communication network;
  (b) for determining a third performance parameter based on the first performance parameter and a second performance parameter, which second performance parameter was previously determined;
  (c) for processing the communication network based on the third performance parameter.

It is noted that the steps of any embodiment of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The solution provided herein further comprises a computer program product directly loadable into a memory of a digital computer, comprising software code portions for performing the steps or parts of the steps of the method as described herein.

In addition, the problem stated above is solved by a computer-readable medium, e.g., storage of any kind, having computer-executable instructions adapted to cause a computer system to perform the method or parts of the method as described herein.

Furthermore, the problem stated above is solved by a communication system comprising at least one device as described herein.

DETAILED DESCRIPTION

Figure 1:
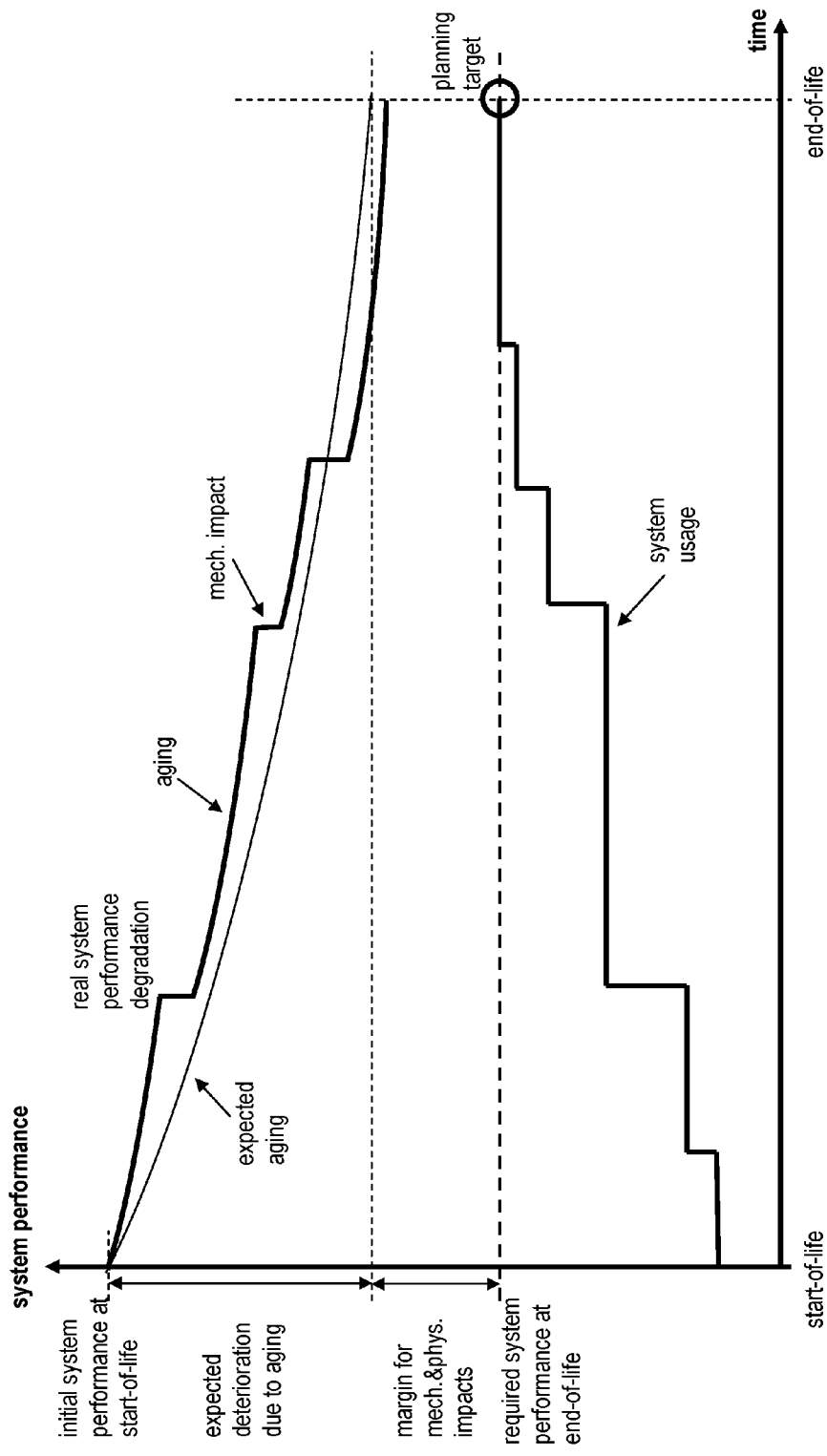
FIG. 1 shows an example of potential real life behavior of a system.
Figure 2:
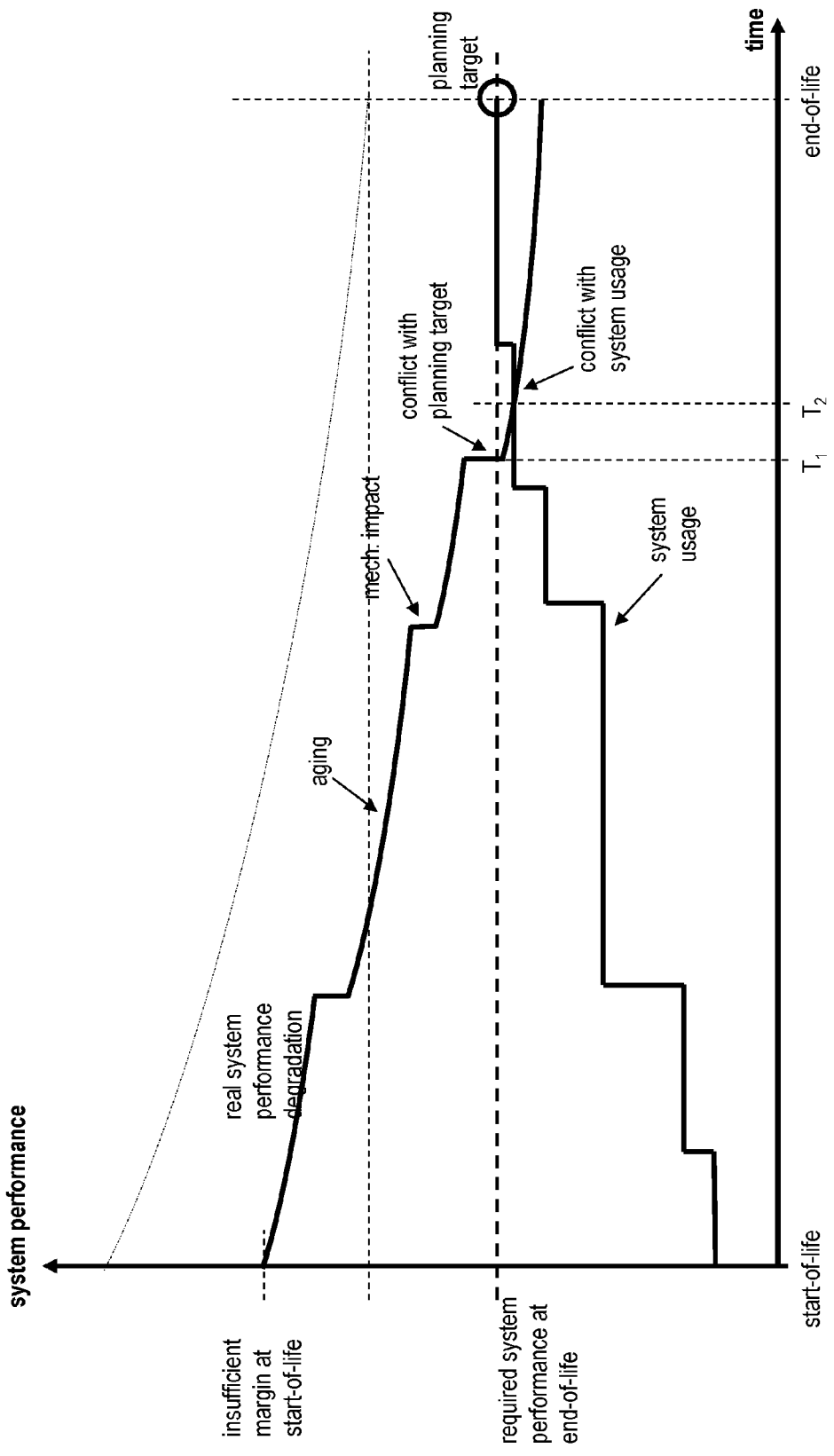
FIG. 2 shows an example of potential effects of insufficient dimensioning of a system.

A network planning tool is used to permanently and automatically observe and supervise the network throughout its complete lifetime. The network planning tool collects measurement data from the network, wherein said data is suitable to describe the optical performance of the network. The network planning tool uses the measurement data to calculate and evaluate actual performance characteristics of the network such as, e.g., power levels, OSNRs and bit error rates. Actual values are compared with results of previous measurements and previously calculated forecasts for the system's performance degradation towards its prospected end-of life. Based on the new (actual) values and the results of the comparisons the forecasts for the system's future performance degradation are updated and stored for use in future comparisons.

As the measurement data reflect the real system characteristics, the resulting performance values will in most cases be better than those estimated based on worst-case assumptions at an early planning stage of the network. Furthermore, the end-of-life performance forecasts are better than the initial target values of previous forecasts. On the other hand, ongoing observations enable an early detection of potential degradations going beyond previous forecasts and thus allow taking early (or at least timely) corrective measures, if required.

The network planning tool may provide for
  monitoring (continuously or at given moments in time),
  correction (in particular adjustment, if required) of performance parameters of the network,
  progressive updates and/or
  extrapolations of related forecasts and thus allows applying relaxed (i.e. less than worst-case) degradation assumptions on the prospected performance degradation of the system over time.

As adjustment is feasible and the system degradation is monitored this approach allows starting at significantly lower margin levels compared to conventional worst-case approaches. However, the approach is still able to react to various degradation effects and thus it is possible to meet the required performance levels at all times during the system's lifetime.

Hence, start-of-life system dimensioning can deviate from worst-case assumptions and be based on less equipment (or on lower-dimensioned equipment) to be installed, configured, operated and maintained leading to significant savings in capital expenditure (CAPEX). In addition, automated monitoring (supervision) and correction of network performance parameters can save a significant amount or operational cost (OPEX) throughout the system's lifetime.

Corrective actions may be based on e.g.
- absolute values of measured or calculated performance parameters,
- comparison results between actual and previously measured or calculated performance parameters, and/or
- newly calculated forecasts for the system performance towards its end-of-life.

Decision criteria may be based on upper or lower boundaries of certain characteristics, thresholds, or whatever other kinds of parameters, values or findings suitable for deriving such a decision.

In case of need for corrective actions, the network planning tool may
- be capable by itself to adjust related network settings and/or to reconfigure the network elements and components involved accordingly, or
- be capable to trigger a Network Management System (NMS) to take appropriate action, or
- alert an operator, e.g., using different levels of urgency and further information indicating, e.g.,
  - any combination of a type of alert,
  - an alarm
  - a notification,
  - a reason for the alert, e.g., a threshold being exceeded or an equipment failure,
  - a severity of the alert, e.g., immediate action required,
  - recommendations on how to handle the alarm, e.g., proposals for parameter changes, equipment reconfigurations, additional equipment to be installed, etc., and/or
  - whatever other kind of further information that could be useful to support the operator in taking adequate decisions.

An alert with related information may also be issued in case the updated forecast for the system's end-of-life performance indicates a potential violation of the performance parameter targets in near future. Corrective measures may comprise any action, e.g.,
- adjusting optical amplifier gains,
- rearrangements of paths in the network,
- replacement of aged or faulty components,
- reconfigurations of the (complete) network, and/or
- upgrade of the network (component).

The network planning tool may be a centralized or a distributed system. The network planning tool may be located at or implemented as part of
- a network management system,
- a network element,
- a separate component located in, associated with, or otherwise attached to the network.

The network planning tool may also be distributed throughout the network or system, or just throughout a portion of the network or system. The system may comprise at least one element or component of the network.

The network planning tool can be realized in software and/or hardware. In this regard, software may be stored and/or distributed using any kind of non-volatile storage media either as a single physical unit or distributed over several physical units. Distribution may also be done by download using at least one of various communication and/or networking means. Parts implemented in software, if loaded into a computer's program memory, are capable of causing the related processor(s) to perform and execute features and steps as specified with the system and method defined and explained herein.

Monitoring may comprise (permanent and/or automatic) observation and/or supervision as well as periodically repeated measurements of system parameters. The system parameters determined may be evaluated by suitable means. Monitoring may lead to automatically generated results. However, manual interaction on a regular or sporadic basis may also be provided and/or feasible. Calculation of new forecasts may include a history of parameters and, e.g., compare it to the previously used worst-case assumptions, so as to get an improved prediction of the future development of the system's behavior.

The planned lifetime of a system extends from a well defined start-of-life point in time, e.g., a moment of the system's initial commissioning, up to a projected end-of-life point in time. The target or projected end-of-life system performance can be determined by at least one service level requirement, expressed by, e.g.,
- power levels,
- OSNRs, and/or
- bit error rates to be met under the assumption of a certain number of channels (or light paths) being activated and/or loaded with a certain amount of traffic despite all optical performance degradations caused by aging and other mechanical or physical or other kind of stress of components.

Network planning fails, if the real-life system does not fulfill the respective performance requirements, when the end-of-life point in time is reached, or if the system does not reach the envisaged end-of-life performance, because it fails to meet the performance requirements of the traffic demand at an earlier point in time. System lifetime and usage may be extended beyond the projected end-of-life point in time, if the system exhibits sufficient margin, when the projected end-of-life point in time is reached.

The network planning tool as specified enables starting with a cost-efficient design of the system and allows for a smooth development of the design according to actual system demands (or degradations) throughout its lifetime. The approach ensures that the expected system performance stays within given thresholds and even enables adaptations to follow a deterioration as a "moving target", i.e. adjust the system when for whatever reason the target (i.e. the presumable end-of-life) performance requirements to the system need to be modified or corrected throughout its lifetime. In other words, it is no longer necessary and required to know and determine the end-of-life performance requirements of the system at the initial planning phase, since the online-monitoring and appropriate corrective measures provides some leeway at a later stage.

Figure 3:
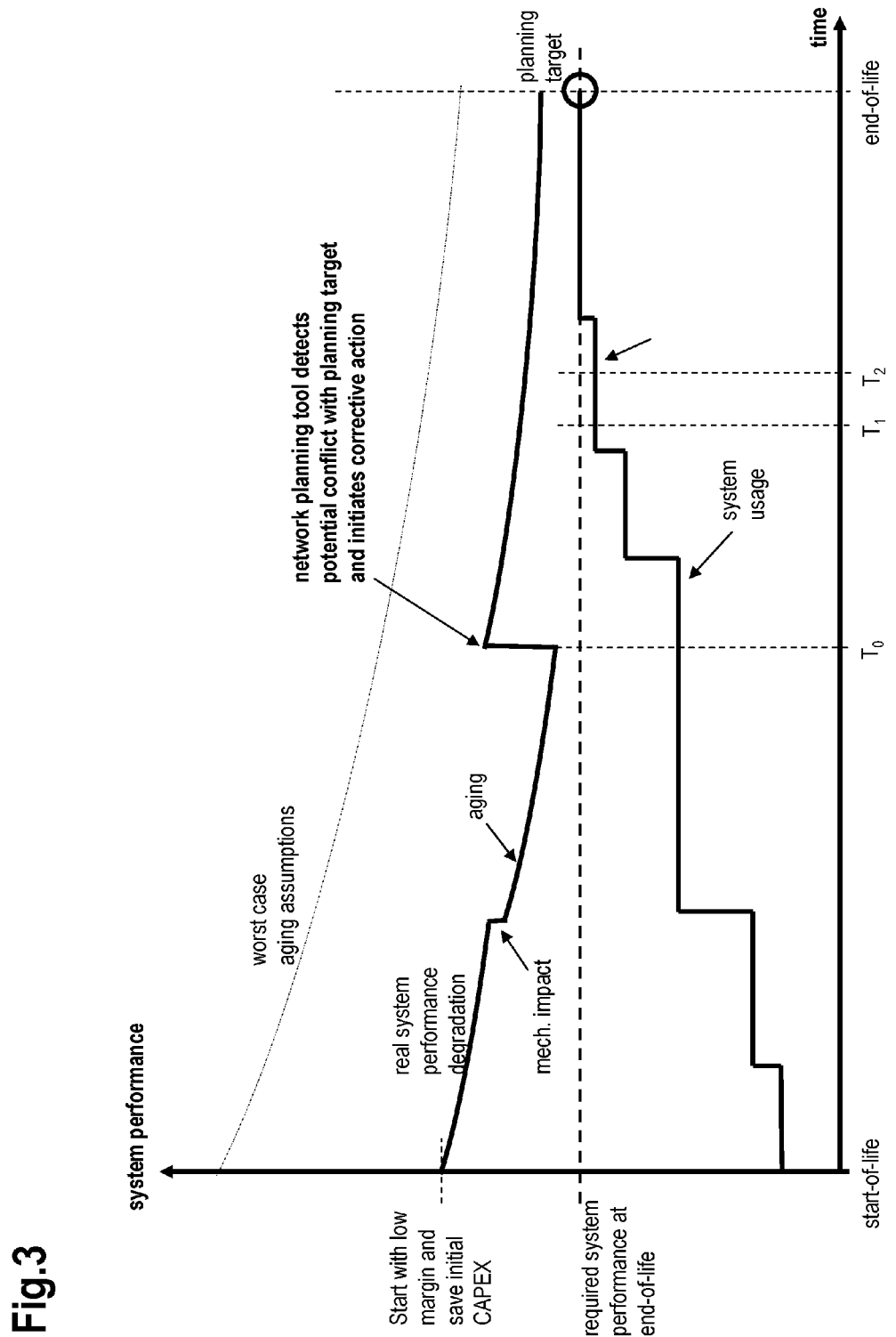
FIG. 3 shows a diagram to visualize processing of a communication network based on an evolution of performance parameters.

FIG. 3 shows a diagram to visualize the effect of the approach described herein. Even when starting with a comparably low (and far from worst-case based) performance margin at a start-of-life, a network planning tool detects at a time T0, i.e. significantly before a time T1 when the required system performance will reach the end-of-life threshold, that the margin is too low compared to the required end-of-life (i.e. the planning target). Hence, the network planning tool initiates corrective actions while the system is still in a safe operating condition. The corrective action may comprise an alert of the network management system or a message or alert sent to an operator.

It is noted that FIG. 3 merely depicts an example. Other decision criteria could, e.g., involve the gap between the actual performance capabilities of the system and the need of the current service demand (or system usage) with or without a forecast of the expected future service demand. Various further criteria can be used. As a consequence, a system using the network planning tool could even be planned and operated without a fixed planning target (see "moving target" above) or with no target values at all. In such a case, additional manually triggered recalculations and checks of the network performance parameters are recommended before new services are committed.

Figure 4:
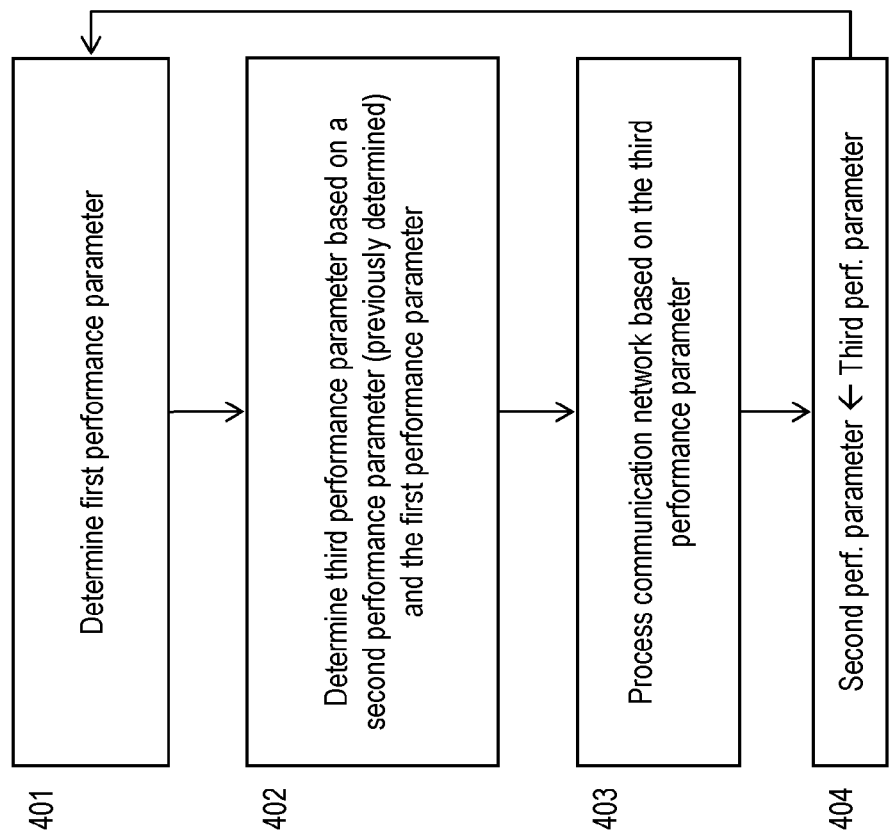
FIG. 4 shows steps of a method that allows adjusting a communication network based on performance measurements.

FIG. 4 shows steps of a method that allows adjusting a communication network based on performance measurements.

In a step 401, a first performance parameter is determined. This can be a measurement or the like conducted at a component of the communication network. It can also be a measurement for a portion of the communication network, e.g., an end-to-end path of an optical network. In a step 402, a third performance parameter is determined based on a second performance parameter (e.g., a previously determined performance parameter that may indicate a threshold value for an end-of-life assessment) and the first parameter, i.e. the actual measurement. Hence, the third performance parameter may indicate whether or not the end-of-life of the communication network (or a portion thereof) can be reached. In a step 403, the communication network is processed pursuant to the third performance parameter. For example, the communication network can be adjusted based on the third performance parameter. It is noted that in case the third parameter indicates that the predicted end-of-life of the communication network can be reached, the processing of the communication network may include no further activity required. The processing of the communication network may also include setting the second performance parameter to include the actual determined third parameter (see step 404), i.e. to build a history of performance parameters, or optionally just to replace related values. Next, the method may automatically or by a particular kind of trigger jump back to step 401 and conduct a subsequent determination of the first performance parameter.

Figure 5:
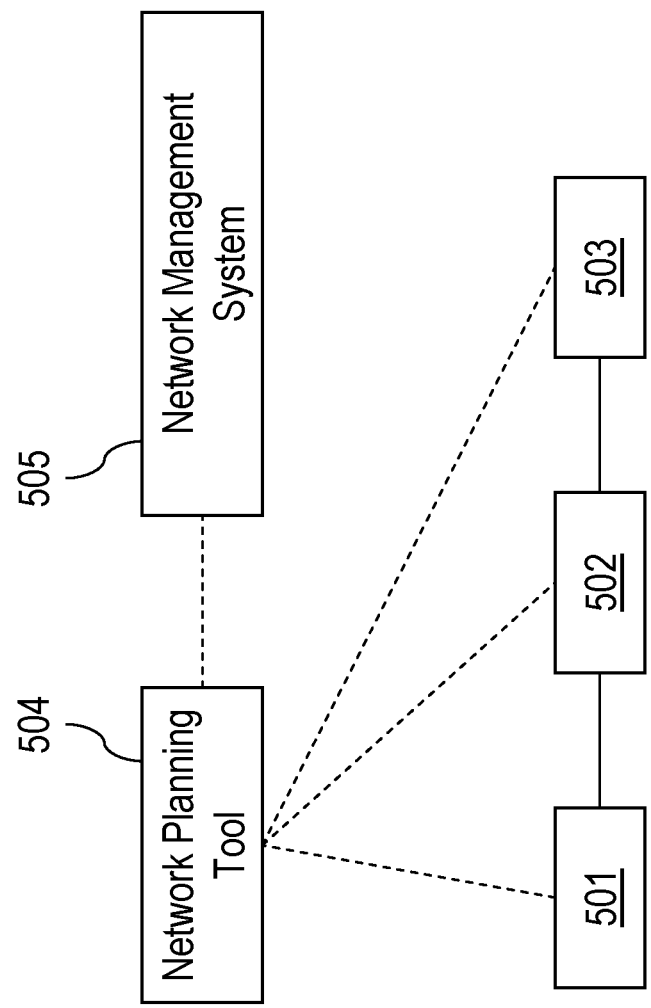
FIG. 5 shows an optical network comprising several components that are monitored by a network planning tool and corrective measures being triggered by said network planning tool in case an assessment of performance parameters reveals that an end-of-life of the communication network is in jeopardy.

FIG. 5 shows an optical network comprising several components 501 to 503 that are monitored by a network planning tool 504 and corrective measures being triggered by said network planning tool 504 in case an assessment of performance parameters reveals that an end-of-life of the communication network is in jeopardy. It is noted that the network planning tool may communicate with a network management system 505. It is also an option that the network management system comprises the network planning tool (not shown in FIG. 5), or that the network management system 505 takes corrective actions based on a trigger by the network planning tool 504 (not shown in FIG. 5).

Figure 6:
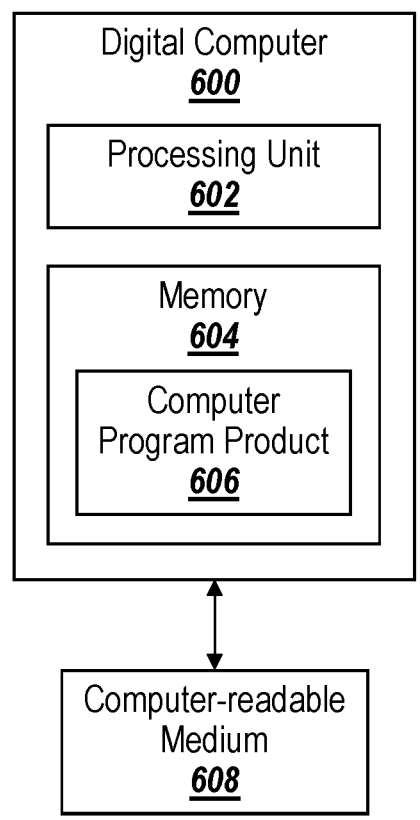
FIG. 6. shows a digital computer with a processing unit, a memory, a computer program product and a computer-readable medium suitable for practicing exemplary embodiments of the present invention.

FIG. 6. shows a digital computer 600 with a processing unit 602, a memory 604, a computer program product 606 and a computer-readable medium 608 suitable for practicing exemplary embodiments of the present invention.

Hence, online feedback of the measured optical parameters is used by the network planning tool. The feedback can be provided by any suitable mechanism and be provided under various conditions such as, e.g., on demand, or regularly, or via unsolicited notifications from network elements. The network planning tool may communicate with a network management system for that purpose as well.

In case that optical parameter changes, which are relevant for the quality of the optical performance, are detected throughout the communication network, a calculation (automatically triggered or upon request) can be conducted that compares the actual parameters determined with previously planned lifetime and/or end-of-life characteristics. If the result reveals that certain objectives, e.g. a planned end-of-life performance of the communication network may not be reachable (e.g., in case the number of planned optical channels can not be activated without the signal quality falling below a predetermined limit), the operator can be informed and/or corrective actions may be triggered. The calculation can be triggered manually, time controlled, e.g. regularly, or by any event, e.g. a change of an optical parameter, or if such change exceeds a given threshold.

Further advantages arise from the capabilities to adjust the communication network based on actual measurement results in combination with historical and/or forecast values. Safety margins can be set to a lower limit thereby reducing the costs involved for the communication network. This is in particular helpful in case a future or final stage of expansion of the communication network is not known at an initial planning stage and it would be expensive to design the communication network to cope with an unknown and thus completely speculative upper limit of a potential target traffic situation (which will be hardly ever reached in a real-life scenario). Network planning can then follow the evolution of the network and its usage adaptively and in shorter and manageable steps while still ensuring compliance with performance requirements over the networks complete evolution and life-time.

It is also a significant advantage of the solution that network planning has to cope with realistic and manageable figures (expected traffic) and time frames only and allows adjusting the communication network well in advance before resource deterioration has an impact on the service provided by the communication network.

Different measures can be initiated or conducted to process the communication network and to maintain the service level required. For example, optical network equipment can be reconfigured or upgraded, or additional equipment can be installed. Such equipment may comprise e.g., pump cards and/or amplifiers, etc., or whatever kind of network node or interconnection equipment.

It is further noted, that any mentioning, naming or listing of measurement, system and/or performance parameters, embodiments of processing a communication network, corrective actions, devices, pieces of equipment, or network elements, in this specification is not to be considered as limiting, and is used by way of example only, and that any person reasonably skilled in the art will be able to apply the principles as outlined in this specification to, with, and using other parameters, processings, actions, devices, equipments, and/or network elements accordingly and appropriately.

That which is claimed:

1. A method, comprising:
   (a) determining a first performance parameter of a communication network based on data representing an actual status and/or a performance capability of at least one network element of the communication network;
   (b) determining a third performance parameter of the communication network based on the first performance parameter and a second performance parameter of the communication network, which second performance parameter was previously determined, wherein the third performance parameter comprises a forecast of a network performance over time until an end of a scheduled lifetime of the communication network, and wherein determining of the third performance parameter is further based on a service level requirement of the communication network; and
   (c) based on the third performance parameter, performing at least one of adjusting a network setting or configuring an element of the network such that the service level requirement is fulfilled at any time of a pre-defined lifetime of the communication network for the determined second parameter.

2. The method according to claim 1, wherein the communication network comprises network elements susceptible to a potential degradation of their performance.

3. The method according to claim 1, wherein said determining of the third performance parameter is further based on a discrepancy between a required end-of-life time performance and a forecasted end-of-life time performance.

4. The method according to claim 1, wherein said method further comprises informing a network management system and/or an operator.

5. The method according to claim 1, further comprising, upon determining the third performance parameter, storing of the third performance parameter as the, or as a portion of, the second performance parameter.

6. The method according to claim 1, wherein an execution of the method is executed periodically.

7. The method according to claim 1, wherein an execution of the method is triggered by a network element and/or a network management system upon detection of a parameter change exceeding a predetermined threshold.

8. The method according to claim 1, wherein the first, second and/or third performance parameter comprises at least one of the following:
   a power level;
   an optical signal-to-noise ratio;
   a bit error rate.

9. The method according to claim 1, wherein the communication network is or comprises an optical communication network.

10. A device comprising
    a memory holding computer-executable instructions;
    processor for executing the computer-executable instructions held in the memory to:
    (a) determine a first performance parameter of a communication network based on data representing an actual status and/or a performance capability of at least one network element of the communication network;
    (b) determine a third performance parameter based on an evolution of the first performance parameter and a second performance parameter, which second performance parameter was previously determined, wherein the third performance parameter comprises a forecast of a network performance over time until an end of a scheduled lifetime of the communication network, and wherein determining of the third performance parameter is further based on a service level requirement of the communication network;
    (c) based on the third performance parameter, perform at least one of adjusting a network setting or configuring an element of the network such that the service level requirement is fulfilled at any time of a pre-defined lifetime of the communication network for the determined second parameter.

11. A non-transitory computer-readable medium containing computer-readable medium instructions, when executed by a processor, cause the processor to perform computer program product directly loadable into a memory of a digital computer, comprising software code portions for performing the steps of the method of claim 1.

* * * * *